United States Patent
Tang et al.

(10) Patent No.: US 10,467,124 B2
(45) Date of Patent: Nov. 5, 2019

(54) CERTIFICATION PROCESS FOR CLOUD PLATFORM

(71) Applicant: General Electric Company, Schenectady, NY (US)

(72) Inventors: Haofeng Tang, San Ramon, CA (US); Roopa Gidugu, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 15/665,647

(22) Filed: Aug. 1, 2017

(65) Prior Publication Data

US 2018/0173609 A1 Jun. 21, 2018

Related U.S. Application Data

(63) Continuation of application No. 15/382,981, filed on Dec. 19, 2016, now Pat. No. 9,753,834.

(51) Int. Cl.
*G06F 11/00* (2006.01)
*G06F 11/36* (2006.01)

(52) U.S. Cl.
CPC ...... *G06F 11/3616* (2013.01); *G06F 11/3664* (2013.01)

(58) Field of Classification Search
CPC . G06F 11/3616; G06F 11/0748; G06F 11/229
USPC ...................................................... 714/38.14
See application file for complete search history.

(56) References Cited

U.S. PATENT DOCUMENTS

| | | | |
|---|---|---|---|
| 7,757,121 B1 | 7/2010 | Perron et al. | |
| 8,082,425 B2 * | 12/2011 | Sudhakar | G06F 9/3824 712/226 |
| 2002/0183056 A1 * | 12/2002 | Lundblade | G06F 8/61 455/425 |
| 2009/0100411 A1 | 4/2009 | Weiss | |
| 2016/0026555 A1 * | 1/2016 | Kuo | G06F 11/3672 717/131 |
| 2016/0070626 A1 * | 3/2016 | Raghavendra | G06F 11/2025 714/6.3 |

(Continued)

OTHER PUBLICATIONS

Nandy, A. and Das, M., "Industrial IoT based machine tool condition monitoring with GE predix time series ingestion and data streaming," Code Project, pp. 1-28 (Aug. 6, 2016).

(Continued)

*Primary Examiner* — Sarai E Butler
(74) *Attorney, Agent, or Firm* — Buckley, Maschoff & Talwalkar, LLC

(57) ABSTRACT

The example embodiments are directed to an automated cloud platform certification process. In one example, the method includes receiving a request for adding an application to the cloud platform, executing the application and performing an automated certification process based on the executed application. According to various embodiments, the automated certification process may include verifying an output of the executed application, verifying an impact of the executed application on the cloud platform is below a predetermined threshold, and verifying the executed application satisfies applicable coding guidelines. The application may be stored or launched on the cloud platform following successful certification.

20 Claims, 6 Drawing Sheets

(56) References Cited

U.S. PATENT DOCUMENTS

2016/0092185 A1* 3/2016 Botti ..................... G06F 8/60
717/103

OTHER PUBLICATIONS

Syer, D., "How to Integrate an Application with Cloud Foundry usingOAuth2," Cloud Foundry, pp. 1-27 (Nov. 5, 2012).
Extended European Search Report and Opinion issued in connection with corresponding EP Application No. 17206974.2 dated May 22, 2018.

* cited by examiner

CERTIFICATION PROCESS FOR CLOUD PLATFORM

CROSS-REFERENCE TO RELATED APPLICATIONS

This applications is a continuation of U.S. patent application Ser. No. 15/382,981 filed on Dec. 19, 2016, in the United States Patent and Trademark Office, the entire disclosure of which is hereby incorporated herein for all purposes.

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include healthcare machines and equipment that aid in diagnosing patients such as imaging devices (e.g., X-ray or MM systems), monitoring devices, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

One of the difficulties in designing a computing platform that supports machine focused software is the amount and the variety of applications that may be of interest to a user through the platform. For example, a power plant user or operator may be interested in viewing and interacting with numerous applications and systems related to the plant in order to manage/view attributes such as generators, cooling towers, a plant floor, materials, alerts, fuel usage, power protection, power distribution, control systems, and/or the like. As another example, an aircraft operator may be interested in viewing and interacting with applications and systems that can influence aircraft such as weather, historical flight data, cargo, fuel, and the like.

Furthermore, machine based applications (or other type of applications) that may be stored on the cloud platform may be created by different vendors using different programming languages. Also, the applications may have different inputs, different outputs, and behave differently from each other. Furthermore, each application must be able to operate within the cloud platform and with other applications that are or that may at some point be stored on the cloud platform. Therefore, a process for testing various types of applications and ensuring that they will work properly when added to the cloud platform is needed.

SUMMARY

Embodiments of the invention described herein improve upon the prior art by providing systems and methods to receive a request to include an application on a cloud platform and applying a certification process to enroll and use the application as part of the broader cloud platform. Such embodiments provide a technical solution to the technical interoperability, configuration and other problems raised by a multiplicity of machine-related and other applications that may exist within an industrial or other environment that contains machines.

In an aspect of an example embodiment, a computing device including a network interface is configured to receive a request for adding an application to a cloud platform, the request comprising a package including the application, information concerning a processor configured to execute the application and perform an automated certification process, information concerning an automated certification process that includes: verifying an output of the executed application, verifying an impact of the executed application on the cloud platform is below a predetermined threshold, and verifying the executed application satisfies coding guidelines associated with the respective application, and a storage device configured to store the application in response to the processor certifying the application via the automated certification process.

In an aspect of another example embodiment, there is provided a cloud platform certification method including receiving a request for adding an application to a cloud platform, the request comprising a package including the application, executing the application and performing an automated certification process based on the executed application, the automated certification process that includes: verifying an output of the executed application, verifying an impact of the executed application on the cloud platform is below a predetermined threshold, and verifying the executed application satisfies coding guidelines associated with the respective application, and storing the application on the cloud platform in response to certifying the application via the automated certification process.

In an aspect of another example embodiment, there is provided a computer readable medium having stored therein instructions that when executed cause a computer to perform a cloud platform certification method including receiving a request for adding an application to a cloud platform, the request comprising a package including the application, executing the application and performing an automated certification process based on the executed application, the automated certification process comprising verifying an output of the executed application, verifying an impact of the executed application on the cloud platform is below a predetermined threshold, and verifying the executed application satisfies coding guidelines associated with the respective application, and storing the application on the cloud platform in response to certifying the application via the automated certification process.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
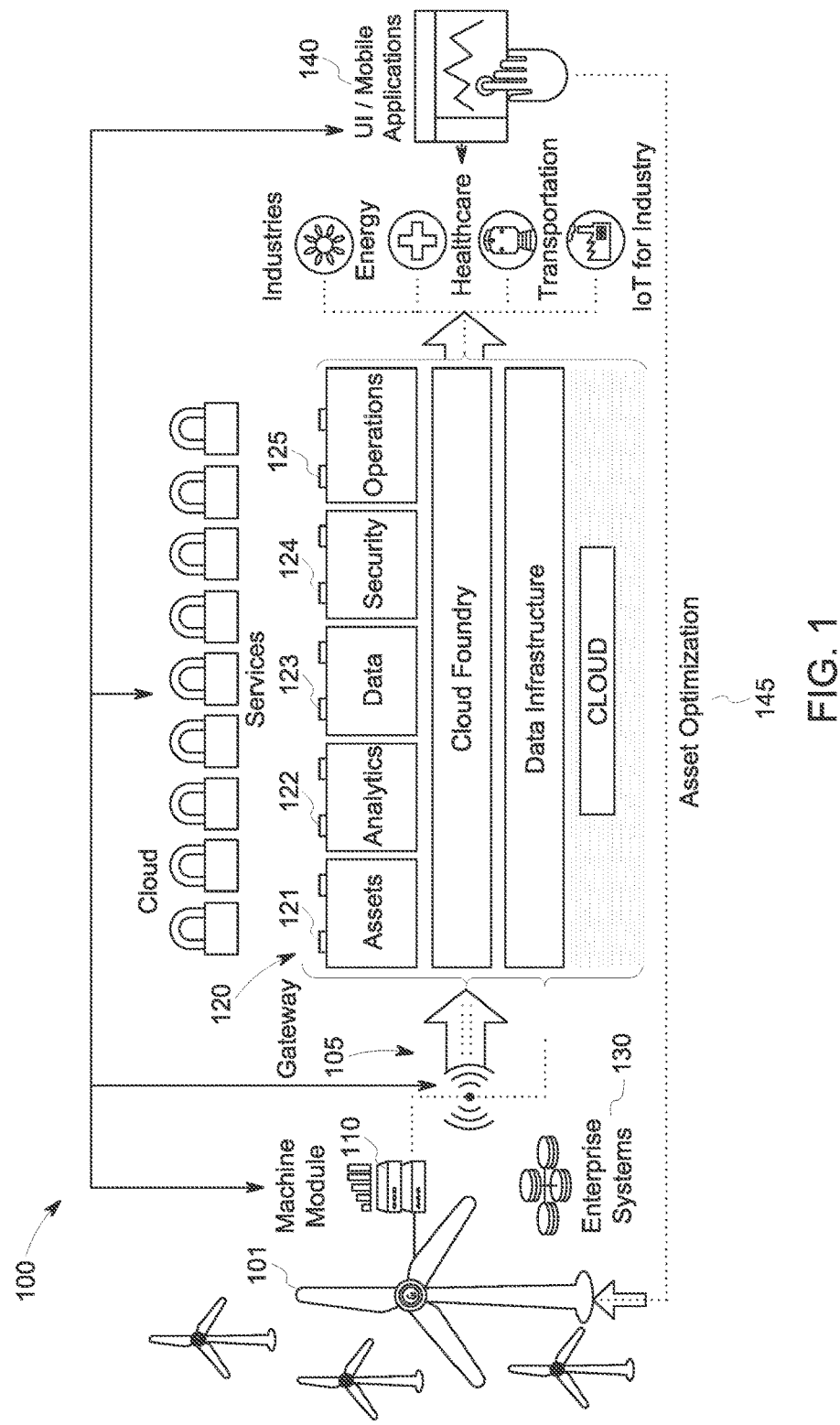
FIG. 1 is a diagram illustrating a cloud computing environment associated with industrial systems in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to an automated certification process for applications being added to a common computing environment such as a cloud platform. The certification process may be part of a larger onboarding process. The certification process may verify that the application being added to the cloud platform behaves as it is expected, ensure that the application does not negatively affect the cloud platform, as well as other tests. Analytical applications (e.g., directed to machine and equipment based assets) may be designed by different vendors and have different subsets of users authorized for use thereof. These applications may be based on different programming languages, libraries, data, and the like. The examples herein are directed to an automated certification process that tests and certifies the analytical applications regardless of a developer or software language used to develop the application. The certification process may perform various automated processes to verify a behavior of an analytic, verify a compatibility of the analytic with the common computing environment, and ensure that the analytic will not operate maliciously within the environment.

According to various embodiments, the certification process includes a number of automated (or partially automated) tests that it performs on an analytic application thereby relieving the burden of a user performing the testing manually which could take significant amounts of time and man hours. In some examples, the certification process may include a sanity test which verifies the behavior of an analytic (e.g., API calls, memory function, input/output, etc.), a platform test which determines whether the analytic will function properly on the common cloud platform, a coding guidelines test that ensures that the analytic satisfies guidelines and standards established by respective programming languages, and a security test which scans the analytic and checks the security of the data, the calls made to other code, .exe files, etc., and reports on the possible security issues. The certification process may be included in an application hosted by and residing within a cloud platform. As another example, the certification process may be included in an application hosted by another type of computing device.

While progress with machine and equipment automation has been made over the last several decades, and assets have become 'smarter,' the intelligence of any individual asset pales in comparison to intelligence that can be gained when multiple smart devices are connected together, for example, in the cloud. Assets, as described herein, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions. Data from the sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like. Examples of the software applications are described herein as analytics. Analytics may be used to analyze, evaluate, and further understand issues related to manufacturing.

The assets can include or can be a portion of an Industrial Internet of Things (IIoT). In an example, an IIoT connects assets including machines and equipment, such as turbines, jet engines, healthcare machines, locomotives, and the like, to the Internet or cloud, or to each other in some meaningful way such as through one or more networks. The systems and methods described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Given assets may have strict requirements for cost, weight, security, performance, signal interference, and the like such that enabling such an interface is rarely as simple as combining the asset with a general purpose computing device. To address these problems and other problems resulting from the intersection of certain industrial fields and the IIoT, embodiments provide a cloud platform that can receive and host applications from many different fields of industrial technologies. In order to successfully host these applications, the embodiments provide an automated certification process that tests/verifies an application before it is added to the cloud platform.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., turbines, healthcare machines, industrial, manufacturing systems, etc.) that is communicatively coupled with the cloud computing system 120. In an example, a machine module 110 receives information from, or senses information about, at least one asset member of the asset community, and configures the received information for exchange with the cloud computing system 120. In an example, the machine module 110 is coupled to the cloud computing system 120 or to an enterprise computing system 130 via a communication gateway 105.

In an example, the communication gateway 105 includes or uses a wired or wireless communication channel that extends at least from the machine module 110 to the cloud computing system 120. The cloud computing system 120 may include several layers, for example, a data infrastructure layer, a cloud foundry layer, and modules for providing various functions. In the example of FIG. 1, the cloud computing system 120 includes an asset module 121, an analytics module 122, a data acquisition module 123, a data security module 124, and an operations module 125. Each of the modules includes or uses a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload applications to the cloud computing system 120. As yet another example, the interface device 140 may be used to access analytical applications hosted by the cloud computing system 120. In an example, information about the asset community may be presented to an operator at the interface device 140. The information about the asset community may include information from the machine module 110, or the information can include information from the cloud computing system 120. The interface device 140 can include options for optimizing one or more members of the asset community based on analytics performed at the cloud computing system 120. Prior to analytics being accessed through the cloud computing system 120, the cloud computing system 120 may certify the analytics.

As a non-limiting example, a user of the interface device 140 may control an asset through the cloud computing system 120, for example, by selecting a parameter update for a first wind turbine 101. In this example, the parameter update may be pushed to the first wind turbine 101 via one or more of the cloud computing system 120, the gateway 105, and the machine module 110. In some examples, the interface device 140 is in data communication with the enterprise computing system 130 and the interface device 140 provides an operation with enterprise-wide data about the asset community in the context of other business or process data. For example, choices with respect to asset optimization can be presented to an operator in the context of available or forecasted raw material supplies or fuel costs. As another example, choices with respect to asset optimization can be presented to an operator in the context of a process flow to identify how efficiency gains or losses at one asset can impact other assets.

Returning again to the example of FIG. 1 some capabilities of the AMP 100 are illustrated. The example of FIG. 1 includes the asset community with multiple wind turbine assets, including the first wind turbine 101. However, it should be understood that wind turbines are merely used in this example as a non-limiting example of a type of asset that can be a part of, or in data communication with, the first AMP 100

FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the first wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120. Prior to those applications being made available, the example embodiments may perform a certification process to verify the behavior, compatibility, and security of the applications.

Information from an asset, about the asset, or sensed by an asset itself may be communicated from the asset to the data acquisition module 123 in the cloud computing system 120. In an example, an external sensor can be used to sense information about a function of an asset, or to sense information about an environment condition at or near an asset. The external sensor can be configured for data communication with the device gateway 105 and the data acquisition module 123, and the cloud computing system 120 can be configured to use the sensor information in its analysis of one or more assets, such as using the analytics module 122. Using a result from the analytics module 122, an operational model can optionally be updated, such as for subsequent use in optimizing the first wind turbine 101 or one or more other assets, such as one or more assets in the same or different asset community. For example, information about the first wind turbine 101 can be analyzed at the cloud computing system 120 to inform selection of an operating parameter for a remotely located second wind turbine that belongs to a different asset community.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

Security can be a concern for data services that exchange data between the cloud computing system 120 and one or more assets or other components. Some options for securing data transmissions include using Virtual Private Networks (VPN) or an SSL/TLS model. In an example, the AMP 100 can support two-way TLS, such as between a machine module and the security module 124. In an example, two-way TLS may not be supported, and the security module 124 can treat client devices as OAuth users. For example, the security module 124 can allow enrollment of an asset (or other device) as an OAuth client and transparently use OAuth access tokens to send data to protected endpoints.

Figure 2:
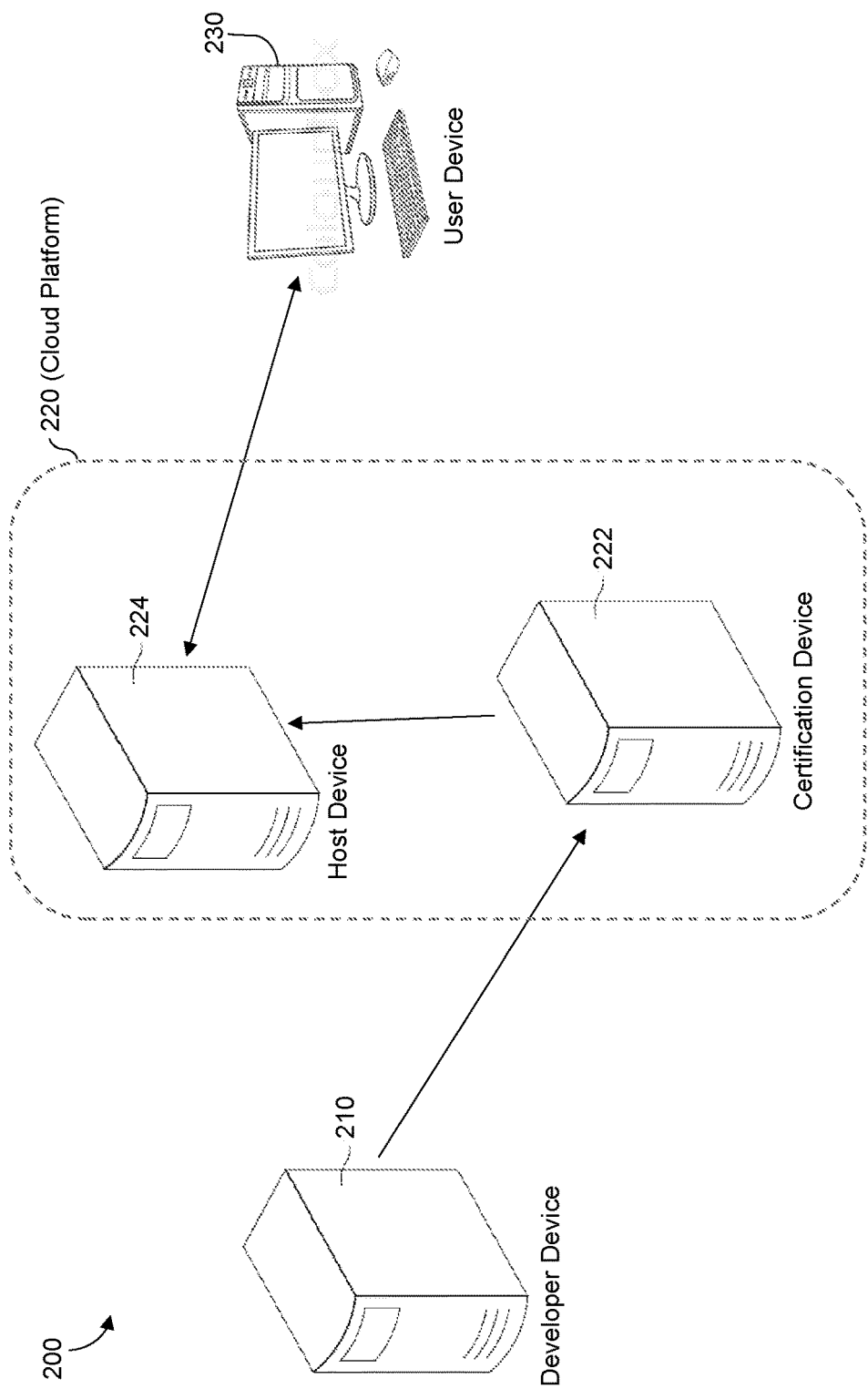
FIG. 2 is a diagram illustrating a system for certifying applications for a cloud computing environment in accordance with an example embodiment.

FIG. 2 illustrates a system 200 for certifying applications for use on a cloud platform in accordance with an example embodiment. In the example of FIG. 2, the system 200 includes a developer device 210 and a user device 230 which are connected to a cloud platform 220 through a network such as the Internet, a private network, or a combination thereof. In this example, the cloud platform 220 includes a certification device 222 for certifying applications that request to be added to the cloud platform 220 and a host device 224 that may host one or more of the applications once they are certified. It should be appreciated though that this is merely an example description, and the host device 224 and certification device 222 may actually be instances running on the cloud platform 220. Furthermore, in FIG. 2, the certification device 222 and the host device 224 are merely shown for convenience of description and the roles performed by both entities may be combined into a single entity or distributed across more than two entities. The system 200 could be used for onboarding applications from the developer device 210 to the cloud platform 220. The certification process described according to various embodiments can be included as part of the larger onboarding process or it may be a standalone process.

The developer device 210 (or provider) may upload or otherwise provide an application to the cloud platform 220 in order to have the application hosted by the cloud platform 220. Before the application is allowed to go live on the cloud platform 220, a certification process may be required. For example, the certification device 222 may perform an automated certification process (or partially automated certification process) on the application to determine whether the application will operate satisfactorily. When the developer device 210 uploads the application to the cloud platform 220, the application may be included in a package of information such as a .zip file, or the like. The certification device 220 may open the package and execute the application. During execution of the application, the certification device 220 may perform one or more tests on the executed application to verify that the application performs as expected, is safe for the cloud platform, and meets coding guidelines associated therewith.

As an example, the certification device 222 may perform one or more of a behavior test (also referred to herein as a sanity test), a platform test, a coding guidelines test, a security test, a scalability test, and the like. During testing, the certification device 222 may verify that the application behaves as expected (e.g., correct input/output) based on sample input and output provided by the developer device 210. The certification device 222 may also verify that the application is not harmful to the cloud platform 220, how much time the application will need during processing, how much space for storage, and the like. The certification device 222 may also identify one or more software programming languages that are used to build the application and ensure that the application satisfies coding conventions of the programming languages. Coding conventions can include a set of guidelines for a specific programming language that recommend programming style, practices, and methods for each aspect of a program written in that language.

If an application fails any of the certification tests, the certification device 222 may generate a notification indicating the reasons for the failure and output the notification on the developer device 210. Furthermore, the application can be prevented from being stored and hosted by the cloud platform 220. If, however, the application passes the certification tests, the certification device 222 may store the application on the cloud platform 220 and/or forward the application to the host device 224 to be hosted within the cloud platform 220. In response, the host device 224 may execute the certified application and provide access to the application by users of the cloud platform 220 such as user device 230 that is connected to the cloud platform 220. Here, the user device 230 may be a workstation, a computer, a laptop, a tablet, a mobile device, an appliance, a kiosk, and the like.

Figure 3:
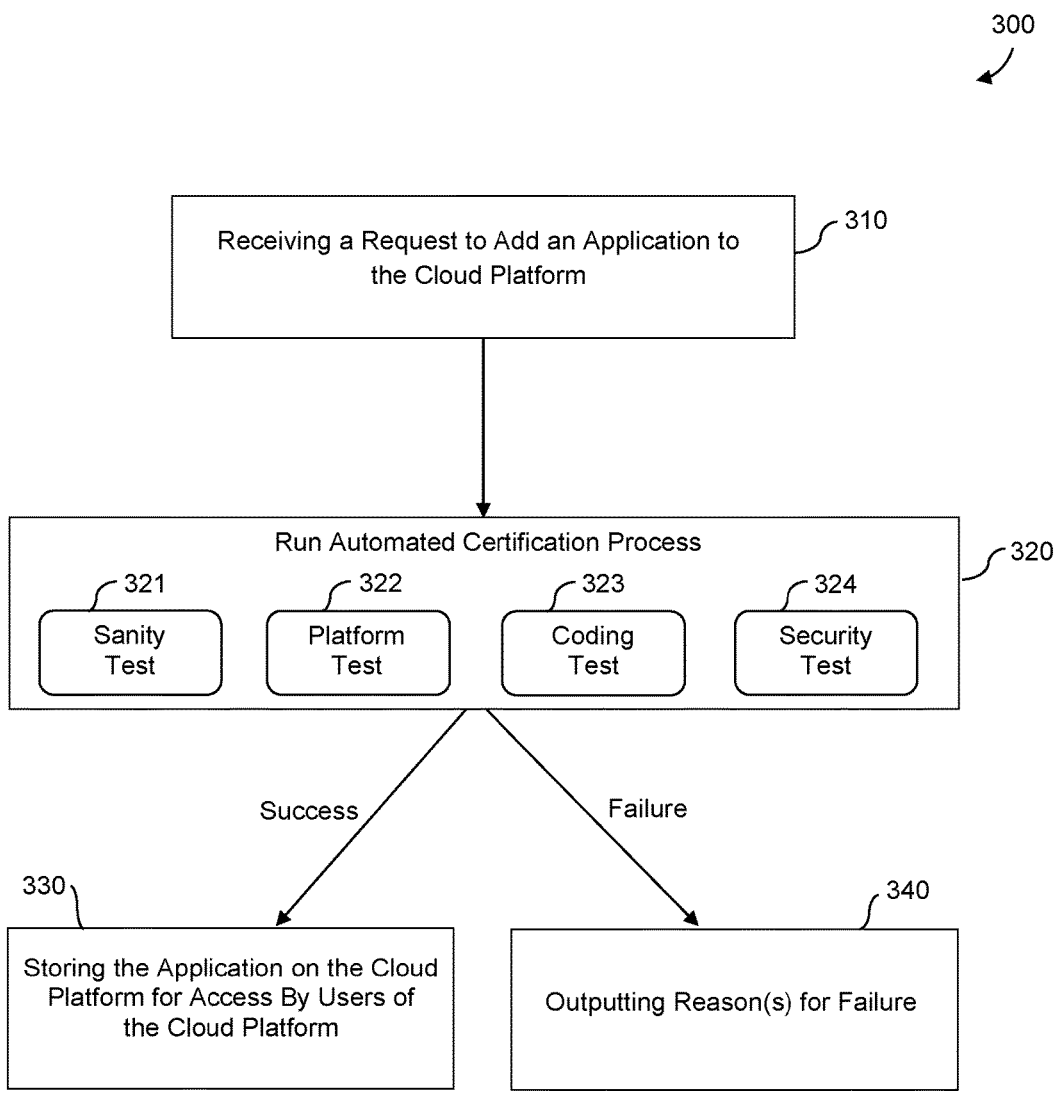
FIG. 3 is a diagram illustrating a method for certifying an application in accordance with an example embodiment.

FIG. 3 illustrates a method 300 for certifying an application in accordance with an example embodiment. For example, the method 300 may be performed by the cloud platform 220 in FIG. 1, or the like. Referring to FIG. 3, in 310, the method includes receiving a request for adding an application to a cloud platform. For example, the request may include a package of files/data including an executable of the application, sample outputs, sample inputs, information about the application such as a programming language, libraries, and the like. In 320, the method includes executing the application and performing an automated certification process based on the executed application.

For example, the automated certification process performed in 320 may include verifying an output of the executed application, verifying that an impact of the executed application on the cloud platform is below a predetermined threshold, verifying the executed application satisfies coding guidelines associated with the respective application, verifying the security of the application, and the like. According to various embodiments, the automated certification process may include one or more of a sanity test 321, a platform test 322, a coding guidelines test 323, a security test 324, and the like. According to various aspects, the certification testing requirements have to be met for an application to pass the certification process shown in FIG. 3, however, the detailed requirement for these tests may vary between application packages developed with different languages.

Figure 4:
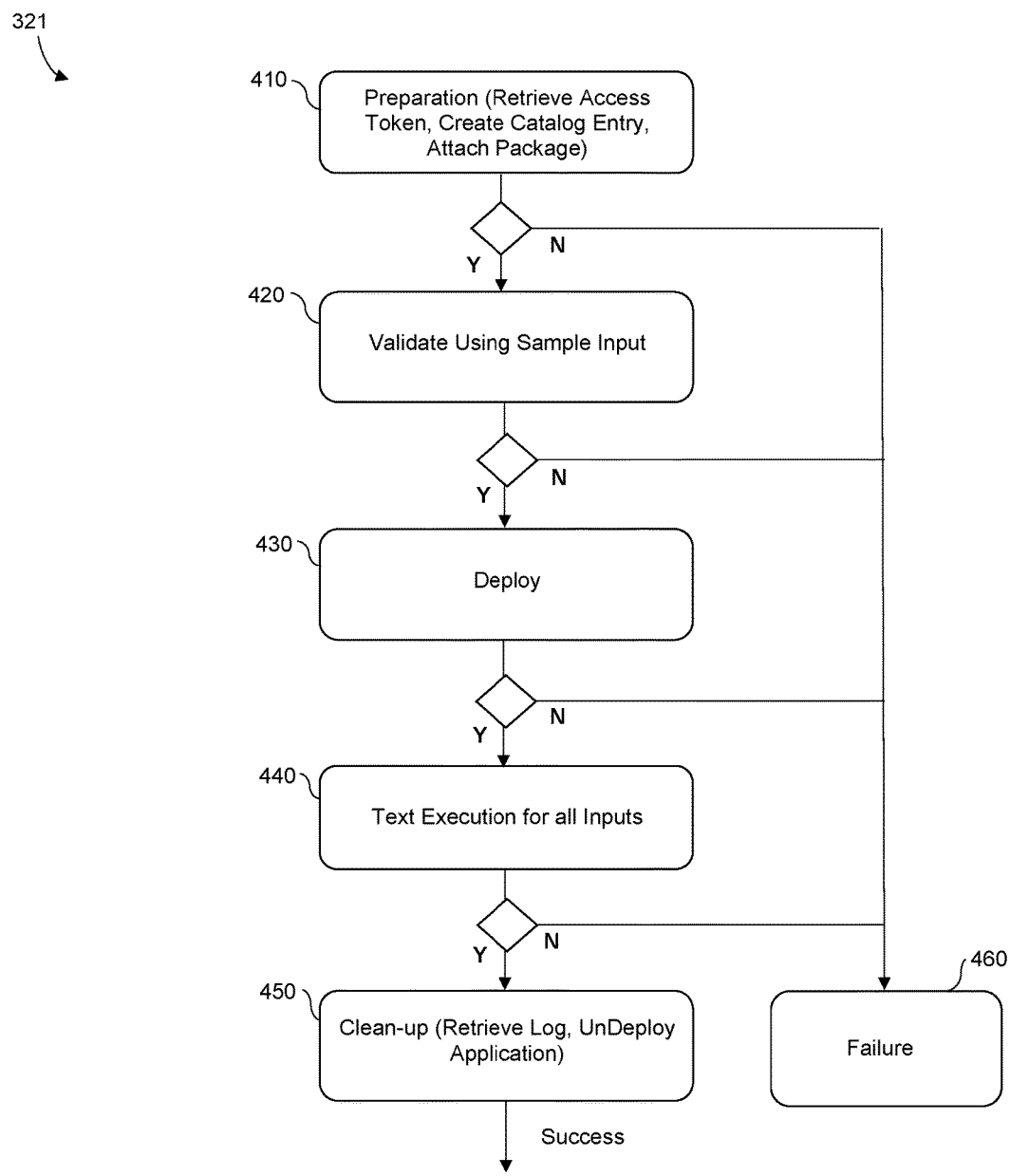
FIG. 4 is a diagram illustrating a behavior test included in a certification process in accordance with example embodiments.

FIG. 4 illustrates an example of the sanity test 321 from FIG. 3. Referring to FIG. 4, the sanity test 321 may verify that the execution of the application (e.g., analytical application, etc.) generates an output as claimed by a provider/developer. That is, the sanity test 321 may verify the behavior of an application based on its inputs and outputs. The sanity test 321 may include one or more automated tests, for example, verifying the package provided by client can be successfully deployed, verifying that the deployed application can successfully consume sample input data, and verifying that the output from the executed application matches the expected result data, which is paired with the input data. According to various embodiments, the sanity test may be designed from a user's prospective, in a non-intrusive manner, to safeguard the successful application of the application in a service-oriented architecture.

To automate the tests, a testing software application or client may be used. The testing client may be built based on Java. The testing client may automatically mimic steps that a human tester would normally do to run the sanity tests. For example, the testing client may perform, in an automated manner, the steps shown in FIG. 4. In 410, the testing client may download the package submitted by provider to a local directory, by making Java file input/output (I/O) call, create a catalog entry for the application by making a representational stat transfer (REST) application programming interface (API) call, and attach an executable package file of the application to the catalog entry, by posting the file through REST API call. In 420, the testing client may submit an input data file, and execute the application by calling REST API, and in 430, the testing client may deploy the application by issuing REST API calls. In 440, the testing client may poll the status of the execution by calling REST API. In 450, the testing client may collect the execution result output by calling REST API, and compare result output data to an expected result provided by the developer by performing JSON data comparison. In addition, in 450 the testing client may retrieve the execution log for documentation purpose by calling REST API. At any point, if the test fails, the test client determines a failure in 460 and outputs a notification of the failure to at least one of the cloud and the developer device. However, if the test is successful, additional certification tests may be performed or the application may be determined as being certified.

Figure 5:
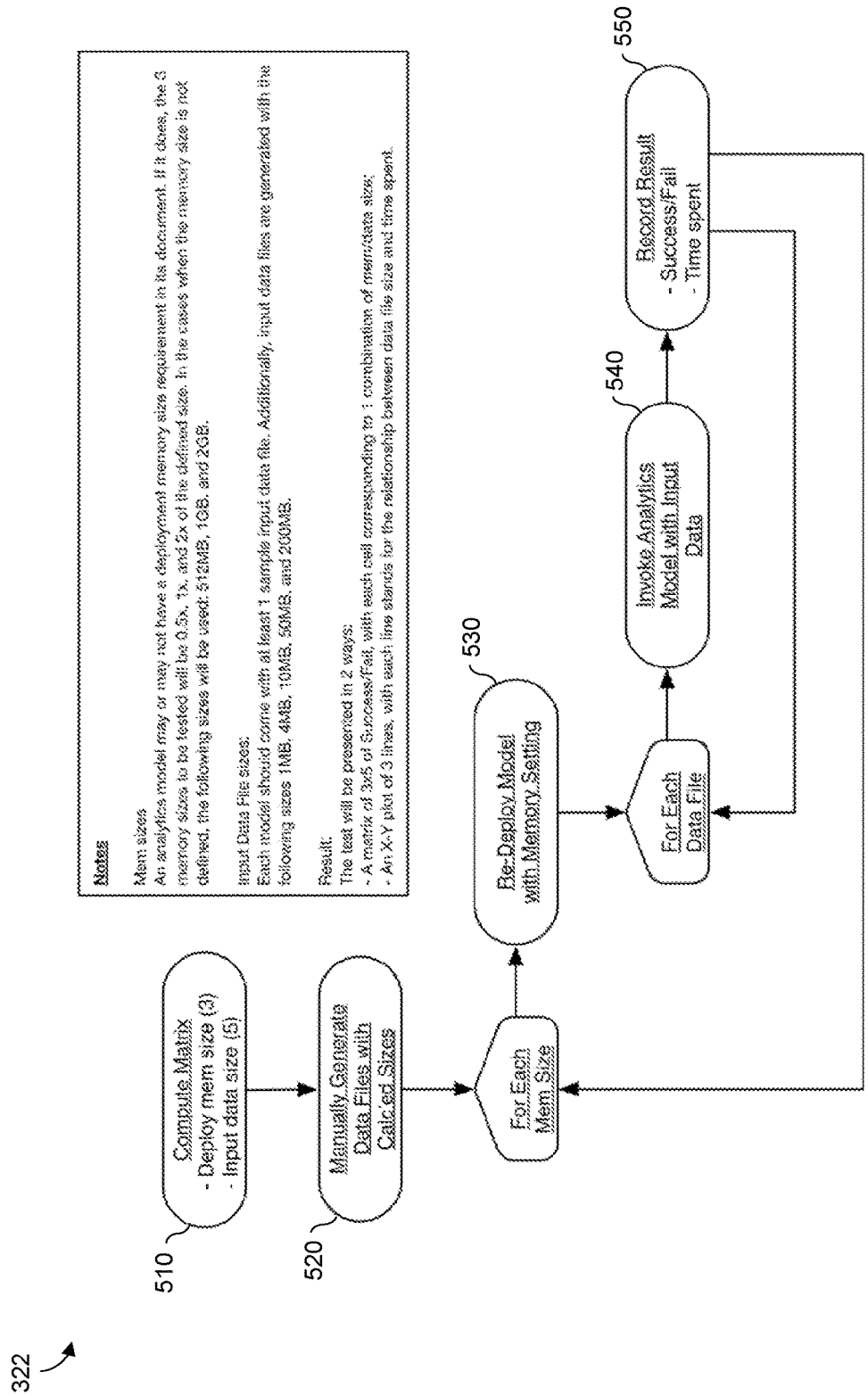
FIG. 5 is a diagram illustrating a platform test included in a certification process in accordance with an example embodiment.

FIG. 5 illustrates an example of the platform test 322 from FIG. 3. The automated platform test 322 may ensure that the execution of the application does not negatively impact the cloud platform. In some examples, the automated platform test may capture a time usage profile for the application and estimate a space usage profile for the application. In this example, a set of input data files with different sizes are used to simulate the different computation loads of the application. Also, the memory capacity of the cloud platform environment where the application is running can be simulated by using different memory size allocations for the deployment of the application. Thus, the test may be performed on a matrix of different sizes of data files and the memory sizes. The memory space usage and execution time may be collected from data extracted from an execution log file of the cloud platform.

Due to the distinctive nature of each application, and the fact that simulated input data are used for the testing, the time/space profile collected in the test may be an estimate. There are two steps involved in running each platform test, including creating simulation data files (510 and 520), and running the tests in 530 and 540. Based on the nature of different applications there are multiple options to create different sizes of test data. For example, a set of fix-sized data files may be created with matching data requirement (file format, data fields, data types, etc.). A typical case is to use simulation data of 1 MB, 4 MB, 10 MB, 50 MB, and 200 MB. As another example, data files may be generated by starting at a size with successful execution (for ex., 10 MB), and followed by incrementally increasing the size of the test file, until either the execution of the application fails due to "Out of Memory" error, or the size reaches a preset cap (for ex., 1 GB). Once the test data files are created, the same approach as that of the sanity test 321 is followed to run the test. The results of each test are stored in 550. Similar to the sanity test, if the platform test is successful, additional certification tests may be performed or the application may be determined as being certified. However, if the test fails, the certification process may also fail.

The coding guidelines test 323 may ensure that the finished package follows development guidelines, and is organized properly. During execution, the coding guidelines test 323 may automatically perform tests to verify that a directory structure of the application complies to the specification per a development white book associated with a programming language of the application, may verify a content (list of files) in the directories follows specification per the white book, may verify if the content of configuration file(s) has to comply to the specification per the white book, and may check library files to ensure that no malicious code been used. The coding guidelines test 323 may verify that the executed application satisfies coding guidelines by identifying at least one programming language used to build the application, and verifying the executed application satisfies coding guidelines for the at least one programming language. Meanwhile, the security test 324 may also perform automated tests to verify that the application does not perform calls to any threatening data, or the like. The security test 324 may also determine whether the application has any potentially threatening data stored therein or attempts to call any unknown executables, and the like.

Referring again to FIG. 3, in 330, if the certification is successful, the method includes storing the application on the cloud platform in response to certifying the application via the automated certification process. In addition to storing the certified application, the cloud platform may launch the certified application (i.e., go live) making the certified application accessible to registered users.

Figure 6:
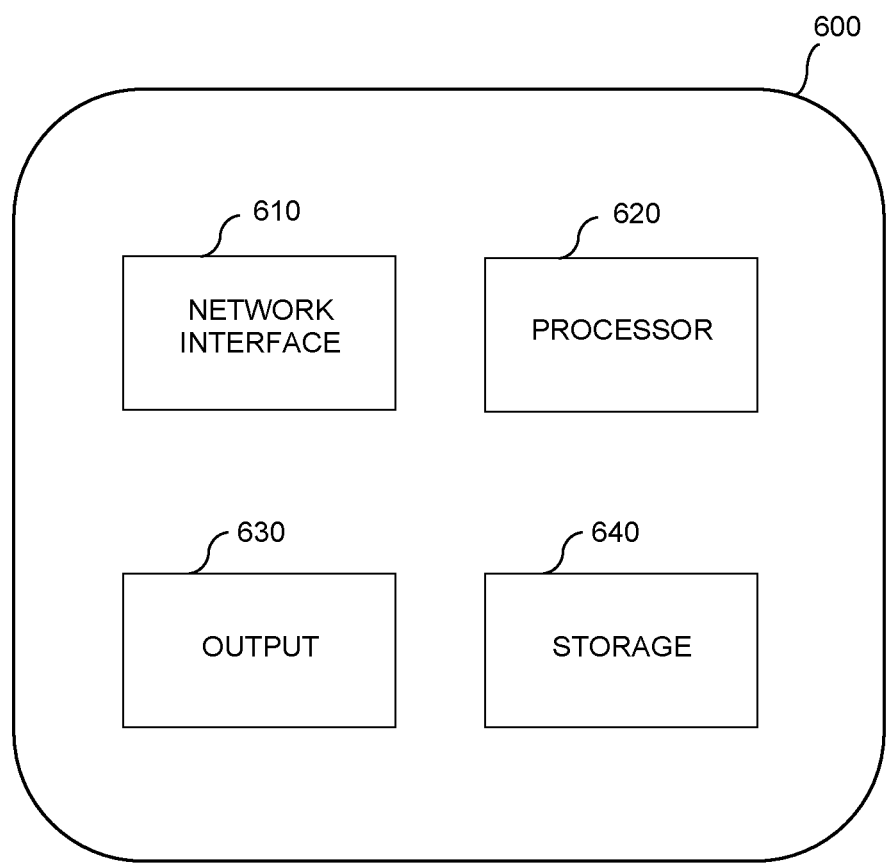
FIG. 6 is a diagram illustrating a computing device for certifying an application in accordance with an example embodiment.

FIG. 6 illustrates a computing device 600 for certifying an application in accordance with an example embodiment. The device 600 may be a cloud computing device in a cloud platform such as the certification device 222 of FIG. 2, or another device. Also, the device 600 may perform the method 300 of FIG. 3. Referring to FIG. 6, the device 600 includes a network interface 610, a processor 620, an output 630, and a storage device 640. Although not shown in FIG. 6, the device 600 may include other components such as a display, an input unit, a receiver/transmitter, and the like. The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the device 500, an externally connected display, a cloud, another device, and the like. The storage device 640 is not limited to any particular storage device and may include any known memory device such as RAM, ROM, hard disk, and the like.

According to various embodiments, the network interface 610 may receive a request for adding an application to a cloud platform. For example, the request may include a package of files and/or other data including an executable file of the application. The processor 620 may execute the application and perform an automated certification process based thereon. For example, the automated certification process may include a sanity test that verifies an output of the executed application, a platform test that verifies an impact of the executed application on the cloud platform is below a predetermined threshold, a coding guidelines test that ensures the executed application satisfies coding guidelines associated with the respective application, a security test that identifies any potential threats associated with the executed application, a scalability test, and the like. If the certification process is successful, the processor 620 may store the application in the storage 640 or in another storage device such as in a cloud platform or external storage device.

As an example, during the sanity test, the processor 620 may verify the output of the executed application by verifying the executed application is deployable on the cloud platform, verifying the executed application consumes sample input data, verifying an output from the executed application matches a predetermined expected output, and the like. During the platform test, the processor 620 may verify the impact of the executed application on the cloud platform by verifying that the executed application does not negatively impact the cloud platform. As another example, during the platform test the processor 620 may detect an amount of processing time and storage space required by the executed application on the cloud platform. During the coding guidelines test, the processor 620 may verify that the executed application satisfies coding guidelines by identifying at least one programming language used to build the application, and verifying the executed application satisfies coding guidelines for the at least one programming language. As another example, the processor 620 may perform a security test that verifies data and executable files in the application, and the processor 620 may output potential security issues identified by the security test to a display device. In response to the application being certified by the automated certification process, the processor 620 may launch the certified application on the cloud platform thereby enabling users to access the certified application via the cloud platform.

According to various embodiments, provided herein is an automated certification process for adding new applications to a cloud platform. An application may be received by the cloud platform and executed, for example, in a test environment. During and/or after execution of the application, the automated certification process may perform a number of tests to verify the behavior of the application, any damage that the application may do to the cloud platform (or other applications hosted thereon), coding guidelines, and the like. If the application passes the automated certification process, the application may be stored on and hosted by the cloud platform enabling users to access the certified application.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
  a network interface configured to receive a request for adding an application to a computing environment, the request comprising a data package including the application and information relating to the application;
  a processor configured to execute the application and perform a predetermined certification process on the application which verifies that an input behavior and an output behavior of the executed application satisfies predetermined application requirements; and
  a storage device configured to store the application in response to the processor certifying the application via the predetermined certification process.

2. The computing system of claim 1, wherein the predetermined certification process performed by the processor further verifies at least one of an impact of the application on the computing environment is below a predetermined threshold, and that the application satisfies applicable coding guidelines.

3. The computing system of claim 1, wherein the predetermined certification process performed by the processor verifies the application is deployable on a cloud computing platform.

4. The computing system of claim 1, wherein the predetermined certification process performed by the processor verifies that the application is capable of consuming sample input data, and verifies that the application is capable of matching a predetermined expected output.

5. The computing system of claim 1, wherein the predetermined certification process performed by the processor verifies an impact of the application on the computing environment by determining whether the application negatively impacts the computing environment.

6. The computing system of claim 1, wherein the predetermined certification process performed by the processor verifies an amount of processing time and storage space required by the application in the computing environment.

7. The computing system of claim 1, wherein the predetermined certification process performed by the processor verifies the executed application satisfies said one or more coding guidelines by identifying at least one programming language used to build the application and verifying the application satisfies coding guidelines for the at least one programming language.

8. The computing system of claim 1, wherein the predetermined certification process comprises performing a security test that verifies data and executable files in the application, and the processor is further configured to output potential security issues identified by the security test to a display device.

9. The computing system of claim 1, wherein the processor is further configured to automatically launch the certified application within the computing environment thereby making the certified application accessible via the computing environment.

10. The computing system of claim 1, wherein the predetermined certification process further verifies whether a simulated storage space usage and a simulated time usage generated by the executed application satisfies one or more predetermined requirements for the computing environment.

11. A method comprising:
  receiving a request for adding an application to a computing environment, the request comprising a data package including the application and information relating to the application;
  executing the application and performing a predetermined certification process on the application which verifies that an input behavior and an output behavior of the executed application satisfies predetermined application requirements; and
  storing the application in the computing environment in response to certifying the application via the predetermined certification process.

12. The method of claim 11, wherein the performing the predetermined certification process further comprises verifying at least one of an impact of the application on the computing environment is below a predetermined threshold, and that the application satisfies applicable coding guidelines.

13. The method of claim 11, wherein the performing the predetermined certification process comprises verifying the application is deployable on a cloud platform.

14. The method of claim 11, wherein the performing the predetermined certification process comprises verifying that the application is capable of consuming sample input data, and verifying that the application is capable of matching a predetermined expected output.

15. The method of claim 11, wherein the performing the predetermined certification process comprises verifying an impact of the application on the computing environment by determining whether the application negatively impacts the computing environment.

16. The method of claim 11, wherein the performing the predetermined certification process comprises verifying an amount of processing time and storage space required by the application in the computing environment.

17. The method of claim 11, wherein the performing the predetermined certification process comprises verifying the application satisfies said one or more coding guidelines by identifying at least one programming language used to build the application and verifying the application satisfies coding guidelines for the at least one programming language.

18. The method of claim 11, wherein the performing the predetermined certification process comprises performing a security test that verifies data and executable files in the application, and the processor is further configured to output potential security issues identified by the security test to a display device.

19. The method of claim 11, wherein the method further comprises automatically launching the certified application in the computing environment thereby making the certified application accessible via the computing environment.

20. A non-transitory computer readable medium having stored therein instructions that when executed cause a computer to perform a method comprising:
- receiving a request for adding an application to a computing environment, the request comprising a data package including the application and information relating to the application;
- executing the application and performing a predetermined certification process on the application which verifies that an input behavior and an output behavior of the executed application satisfies predetermined application requirements; and
- storing the application in the computing environment in response to certifying the application via the predetermined certification process.

\* \* \* \* \*